United States Patent Office 2,988,556
Patented June 13, 1961

2,988,556
PROCESS FOR THE PREPARATION OF 17α,21-DIHYDROXY 3,11,20-TRIKETO - ALLOPREGNANE-21-ACYLATE
Jacobus Simon Favier, Heesch, Netherlands, assignor to Organon Inc., Orange, N.J., a corporation of New Jersey
No Drawing. Filed Sept. 21, 1959, Ser. No. 841,029
Claims priority, application Netherlands Oct. 10, 1958
4 Claims. (Cl. 260—397.45)

The invention relates to the preparation of 17α,21-dihydroxy-3,11,20-triketo-allopregnane-21-acylate from the corresponding 3β-hydroxy compound by oxidation with a N-halogenated carboxylic amide or carboxylic imide in a tertiary alcohol and in the presence of an acid-binding agent.

It is known from the article of Th. H. Kritchevsky et al. in J. Am. Chem. Soc., vol. 74, pages 483–486 (1952) that a 3α-hydroxy-pregnane compound can be oxidized to the corresponding 3-keto compound by means of N-bromo acetamide or N-bromo succinimide in the presence of t-butanol and pyridine.

A similar oxidation of a 3β-hydroxy-pregnane compound of the allo series is described in the British Patent No. 744,981. The conversion disclosed therein relates to the oxidation of the 3β,11α,17α,21-tetrahydroxy-20-keto-allopregnane-21-acetate to the corresponding 3,11-diketo compound by means of N-bromo acetamide in the presence of pyridine.

It has appeared that this known oxidation method applied to the 3β,17α,21-trihydroxy-11,20-diketo-allopregnane-21-acylate, gives considerably lower yields of the corresponding 3-keto compound than when start is made from the 3α-hydroxy-pregnane compound of the normal series. In the former case the yield of the oxidation in question is only about 70%.

It was now surprisingly found that a considerable improvement of the yield of at least 10% can be obtained when the reaction is carried out in the presence of a halogenated aliphatic hydrocarbon.

According to the invention the 17α,21-dihydroxy-3,11,20-triketo-allopregnane-21-acylate is prepared from the 3β,17α,21 - trihydroxy - 11,20 - diketo - allopregnane - 21-acylate by oxidizing the latter compound by means of a carboxylic imide or carboxylic amide halogenated at the nitrogen in a mixture of a tertiary alcohol, an acid-binding agent, and a halogenated aliphatic hydrocarbon.

The ester grouping present in 21-position of the starting product may be derived both from an aliphatic, aromatic, and from an araliphatic carboxylic acid.

In general start is made from the 21-acetate of the present compound.

As examples of N-halogenated carboxylic imides or amides to be applied are mentioned: N-bromo-acetamide, N-chloro-acetamide, N-bromo-phthalimide, N-bromo-succinimide and N-chloro-succinimide.

Preferably N-bromo-succinimide is used.

As acid-binding agents can be used for example picoline, collidine, pyridine, toluidine, quinoline, or N-dimethyl-aniline. Preferably pyridine is used.

T-butanol or t-amyl alcohol is usually applied as tertiary alcohol.

As examples of halogenated hydrocarbons to be applied in the present reaction are mentioned: dichloro methane, dichloro ethane, trichloro ethane, chloroform, bromoform, carbon tetrachloride, dichloro butane, bromobutane, and the like. It is to be preferred to apply a halogenated saturated aliphatic hydrocarbon with 1 to 6 carbon atoms, in which are to be considered specially chloroform and methylene chloride.

The oxidation according to the invention is usually carried out in such a manner that the compound to be oxidized is dissolved in a mixture of a tertiary alcohol, an acid-binding agent, and a halogenated hydrocarbon. The weight ratio between steroid and halogenated hydrocarbon preferably is 1:10–15. The dissolving of the steroid compound is usually carried out while heating gently. The calculated quantity of oxidizing agent is added to this solution preferably after cooling to about 25° C. In most of the cases more than 1 mol of oxidizing agent is applied per mol of steroid usually 1.5–4 mol per mol of steroid.

The thus prepared reaction mixture is allowed to react for a certain time dependent on the reaction temperature. The reaction temperature may vary between 0 and 55° C., the reaction time between 2 hours and some days. Usually the oxidation is carried out at a temperature of about 45° C. for 3–4 hours.

The 17α,21-dihydroxy-3,11,20-triketo-allopregnane-21-acylate obtained according to the invention is important as an intermediate for the preparation of valuable corticosteroids, such as cortisone, prednisone, and the like. For example, it is possible to convert this compound in one reaction step into the prednisone-21-acylate by means of selenium dioxide.

The following examples illustrate the invention.

Example I

In a nitrogen atmosphere 45 g. of 3β,17α,21-trihydroxy-11,20-diketo-allopregnane-21-acetate are dissolved, while heating to 75° C., in a mixture of 540 ml. of chloroform, 810 ml. of t-butanol, and 45 ml. of pyridine. Then the mixture is cooled to 45° C., after which 36 g. of N-bromo succinimide are added while stirring.

The reaction mixture is left to react at a temperature of 45° C. for 4 hours, after which the formed bromine is removed by adding to the mixture a solution of sodium sulphite in water. The reaction mixture is poured into ice-water, after which the chloroform layer is separated. The chloroform solution is washed with a dilute sodium sulphite solution, subsequently with icy-cold 1 N sulphuric acid, then with water, dried on sodium sulphate, and finally evaporated to dryness in vacuo. The residue is recrystallized from acetone, yielding 38 g. of 17α,21-dihydroxy-3,11,20-triketo-allo-pregnane-21-acetate, or 85%, of melting-point of from 223–228° C.; [α]_D=80° (acetone).

In analogous manners also the 21-butyrate and 21-phenyl propionate of the present compound have been oxidized to the corresponding 3-keto compounds in a yield of 85 resp. 83%.

Example II

At a temperature of 20° C. and while stirring 15 g. of N-bromo-acetamide are added to a solution of 23 g. of 3β,17α,21 - trihydroxy - 11,20 - diketo - allopregnane - 21-acetate in a mixture of 40 ml. of picoline, 425 ml. of t-butanol, and 340 ml. of methylene chloride. The reaction mixture is left to react at room temperature for 12 hours, after which the mixture is processed as described in Example I. Obtained is the 17α,21-dihydroxy-3,11,20-triketo-allopregnane-21-acetate in a yield of 84%.

In the same manner the 3β,17α,21-trihydroxy-11,20-diketo-allopregnane-21-propionate has been converted into the corresponding 3-keto compound.

Example III 30 g. of 3β,17α,21-trihydroxy-11,20-diketo-allopregnane-21-acetate are dissolved, while heating, in a mixture of 50 ml. of N-dimethyl aniline, 385 ml. of t-amyl alcohol, and 420 ml. of carbon tetrachloride. Then the mixture is cooled to 20° C., after which 48 g. of N-bromophthalimide are added, while stirring. The reaction mixture is left to stand at 20° C. for 24 hours, after which it is processed as described in Example I. Obtained is the 17α,21 - dihydroxy - 3,11,20 - triketo - allopregnane-21-acetate in a yield of 82%.

I claim:

1. Process for the preparation of 17α,21-dihydroxy-3,11,20-triketo-allopregnane-21-acylate comprising reacting 3β,17α,21 - trihydroxy - 11,20 - diketo - allopregnane - 21-acylate with a compound selected from the group consisting of N-bromo succinimide, N-bromo-acetamide and N-bromo-phthalimide and in the presence of a tertiary alcohol selected from the group consisting of t-butanol and t-amyl alcohol, a tertiary amine and a halogenated aliphatic hydrocarbon.

2. Process for the preparation of 17α,21-dihydroxy-3,11,20 - triketo-allopregnane-21-acylate comprising reacting 3β,17α,21 - trihydroxy-11,20-diketo-allopregnane-21-acylate with a compound selected from the group consisting of N-bromo-succinimide, N-bromo-acetamide and N-bromo phthalimide and in the presence of a tertiary alcohol selected from the group consisting of t-butanol and t-amyl alcohol, a tertiary amine and a halogenated saturated aliphatic hydrocarbon with 1 to 6 carbon atoms.

3. Process for the preparation of 17α,21-dihydroxy-3,11,20-triketo-allopregnane-21-acylate comprising reacting 3β,17α,21 - trihydroxy - 11,20 - diketo - allopregnane - 21-acylate with a compound selected from the group consisting of N-bromo-succinimide, N-bromo-acetamide and N-bromo-phthalimide and in the presence of a tertiary alcohol selected from the group consisting of t-butanol and t-amyl alcohol, a tertiary amine and chloroform.

4. Process for the preparation of 17α,21-dihydroxy-3,11,20-triketo-allopregnane-21-acylate comprising reacting 3β,17α,21 - trihydroxy - 11,20 - diketo - allopregnane-21-acylate with a compound selected from the group consisting of N-bromo-succinimide, N-bromo-acetamide and N-bromo-phthalimide and in the presence of a tertiary alcohol selected from the group consisting of t-butanol and t-amyl alcohol, a tertiary amine and methylene chloride.

References Cited in the file of this patent

UNITED STATES PATENTS

| | | |
|---|---|---|
| 2,691,029 | Hanze et al. | Oct. 5, 1954 |
| 2,714,599 | Fonken et al. | Aug. 2, 1955 |
| 2,773,079 | Djerassi et al. | Dec. 4, 1956 |
| 2,843,611 | Fonken | July 15, 1958 |